(12) United States Patent
Link et al.

(10) Patent No.: US 9,434,338 B2
(45) Date of Patent: *Sep. 6, 2016

(54) CONNECTOR FOR AN ANIMAL FENCE

(71) Applicant: Precision Pet Products, Inc., Costa Mesa, CA (US)

(72) Inventors: David Link, Costa Mesa, CA (US); Hongkun Liang, Zhongshan (CN)

(73) Assignee: Precision Pet Products, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,518

(22) Filed: Feb. 6, 2015

(65) Prior Publication Data

US 2015/0232052 A1    Aug. 20, 2015

Related U.S. Application Data

(63) Continuation of application No. 14/182,764, filed on Feb. 18, 2014, now Pat. No. 8,973,964.

(51) Int. Cl.
| | |
|---|---|
| *B62D 33/04* | (2006.01) |
| *B60R 21/02* | (2006.01) |
| *E06B 9/01* | (2006.01) |
| *A01K 1/02* | (2006.01) |

(52) U.S. Cl.
CPC ........... *B60R 21/026* (2013.01); *A01K 1/0272* (2013.01); *E06B 9/01* (2013.01); *Y10T 403/32475* (2015.01)

(58) Field of Classification Search
CPC ..... B60R 21/026; A01K 1/0272; E06B 9/01; Y10T 403/32475

See application file for complete search history.

(56) References Cited

U.S. PATENT DOCUMENTS

| | | |
|---|---|---|
| 3,044,800 A | 7/1962 | Wicker |
| 4,528,768 A | 7/1985 | Anderson |
| 4,852,290 A | 8/1989 | Wallace et al. |
| D326,076 S | 5/1992 | Wiese |
| 5,167,246 A | 12/1992 | Mortenson |
| 5,402,596 A | 4/1995 | Gillming, Jr. |
| 6,305,869 B1 | 10/2001 | Chen |
| D473,838 S | 4/2003 | Wang |
| 6,582,169 B1 | 6/2003 | Cano-Rodriguez |
| 6,706,045 B2 | 3/2004 | Lin et al. |
| 6,796,589 B2 | 9/2004 | Dolman |
| 6,799,534 B1 | 10/2004 | Wang |
| 7,017,520 B2 | 3/2006 | Wang |
| 8,973,964 B2 | 3/2015 | Link et al. |
| 2003/0057722 A1 | 3/2003 | Dolman |
| 2007/0210597 A1 | 9/2007 | Wang |
| 2012/0181808 A1 | 7/2012 | Reed et al. |

*Primary Examiner* — Lori L Lyjak
(74) *Attorney, Agent, or Firm* — Global IP Counselors, LLP (57) ABSTRACT

A connector for use with an animal barrier. The connector includes a locking member configured to lock corresponding horizontal and vertical members when the locking member is in the locked position, and release the corresponding horizontal and vertical members to allow for length adjustment of both the horizontal and vertical members when the s is in the release position.

15 Claims, 6 Drawing Sheets

CONNECTOR FOR AN ANIMAL FENCE

CROSS-REFERENCE TO RELATED APPLICATIONS

This is a continuation patent application of U.S. patent application Ser. No. 14/182,764 filed Feb. 18, 2014, which application claims the benefit of U.S. Provisional Application No. 61/766,632, filed Feb. 19, 2013, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to an animal fence or barrier for use in a vehicle, and more specifically to a connector which allows for rapid adjustment and securement of the fence along two axes.

2. Related Art

Pets commonly accompany their owners during travel in an automobile. In some instances, the pet is simply placed in the vehicle with the owner and is allowed to roam freely within the interior of the vehicle. On the other hand, some pets are placed within a cage in the back seat or cargo area of the vehicle. Cages may also be used to contain wild animals during transport in a vehicle.

Although these practices allow the pet/animal to remain in the vehicle with the owner/driver, such practices suffer from several deficiencies. For instance, if the animal is left uncontained in the vehicle, the animal may cause damage to itself, the driver, or passengers in the vehicle. In particular, the unpredictable behavior of an animal may startle the driver and cause an accident. The animal may also become scared or agitated by the driving or by passing objects, causing the animal to bound about the vehicle interior. However, if the animal is caged, the cage may be too small or confining for the animal.

Therefore, certain barriers have been developed which may be constructed within the vehicle to define an area within the vehicle within which the animal may be contained while in the vehicle. The barrier may separate the animal from the driver and passengers, while at the same time provide more space for the animal than a conventional cage. Many conventional barriers include both horizontal and vertical members, which are joined by a connector.

Although such barriers provide certain advantages over simply letting the animal roam throughout the entire vehicle or by confining the animal to a conventional cage, many existing barriers do not allow for easy adjustability to conform the barrier to the specific dimensions of the vehicle. Along these lines, the size of the barrier may need to be adjustable for use in a sedan, hatchback, SUV, minivan, conversion van, cargo van, or other types of vehicle.

A common deficiency associated with many prior art connectors is that such connectors generally do not allow for easy and rapid length adjustment of both the horizontal and vertical members. Rather, many connectors include a first locking mechanism which must be released for adjustment of the vertical member, and a second locking mechanism which must be released from adjustment of the horizontal member. Thus, adjustment of the barrier in two directions would require a two-step process.

Therefore, there exists a need for an improved connector for use in an animal barrier which allows for easy adjustability of the animal barrier in both the horizontal and vertical directions to conform the sized of the barrier to the sized of the vehicle.

BRIEF SUMMARY

In accordance with one embodiment of the present disclosure, there is provided a connector for use with an animal barrier which solves the above-described deficiencies of prior art barriers. Along these lines, the connector includes a locking member configured to lock corresponding horizontal and vertical members when the locking member is in the locked position, and release the corresponding horizontal and vertical members to allow for length adjustment of both the horizontal and vertical members when the locking members is in the release position. Therefore, separate locking members are not needed for the corresponding horizontal and vertical members. Thus, the connector simplifies adjustment of the animal barrier to allow the animal barrier to be easily adapted to the specific size of the vehicle.

An adjustable animal barrier comprising a length-adjustable first barrier member extending along a first axis, and a length-adjustable second barrier member extending along a second axis offset from the first axis. A connector is coupled to the first barrier member and the second barrier member. The connector includes a connector body having a first opening configured to receive the first barrier member and a second opening configured to receive the second barrier member. A first clamp is coupled to the connector body and is configured to exert a first circumferential force upon the first barrier member. The first clamp is moveable relative to the connector body between a first clamping position and a first release position. The first circumferential force increases as the first clamp moves from the first release position the first clamp position. A second clamp is coupled to the connector body and is configured to exert a second circumferential force upon the second barrier member. The second clamp is moveable relative to the connector body between a second clamping position and a second release position. The second circumferential force increases as the second clamp moves from the second release position the second clamp position. A first locking member is operatively coupled to the connector body and is operatively coupled to the first clamp and the second clamp. The first locking member is selectively transitional relative to the connector body between a first locking member release position and a first locking member clamping position. The first locking member causes the first clamp and second clamp to move toward the first clamp position and second clamp position, respectively, as the first locking member transitions from the first locking member release position toward the first locking member clamping position.

The connector body and at least one of the first clamp and the second clamp may be formed as a unitary structure. The adjustable first locking member and at least one of the first clamp and the second clamp may be formed as a unitary structure.

The first locking member may be rotatably coupled to the connector body.

The first clamp may be biased toward the first release position and the second clamp may be biased toward the second release position.

The connector body may include a cuff and the first locking member may include a shaft sized and configured to be disposed within the cuff. The cuff may include a slot and the first locking member may include a guide connected to the second clamp and moveable within the slot, such that movement of the guide within the slot causes the second clamp to transition between the second release position and the second clamp position.

The adjustable animal barrier may additionally include a length-adjustable third barrier member extending along a third axis parallel to the first axis, and a third opening formed within the connector body, wherein the first and third openings are disposed about respective axes that are parallel to each other. A third clamp may be coupled to the connector body and configured to exert a third circumferential force upon the third barrier member. The third clamp may be moveable relative to the connector body between a third clamping position and a third release position, the third circumferential force increasing as the third clamp moves from the third release position the third clamp position. A fourth clamp may be coupled to the connector body and configured to exert a fourth circumferential force upon the second barrier member, the fourth clamp being moveable relative to the connector body between a fourth clamping position and a fourth release position, the fourth circumferential force increasing as the fourth clamp moves from the fourth release position the fourth clamp position. A second locking member may be operatively coupled to the connector body and operatively coupled to the third and fourth clamps. The second locking member may be selectively transitional relative to the connector body between a second locking member release position and a second locking member clamping position, the second locking member causing the third clamp and the fourth clamp to move toward the third clamp position and fourth clamp position, respectively, as the second locking member transitions from the second locking member release position toward the second locking member clamping position.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
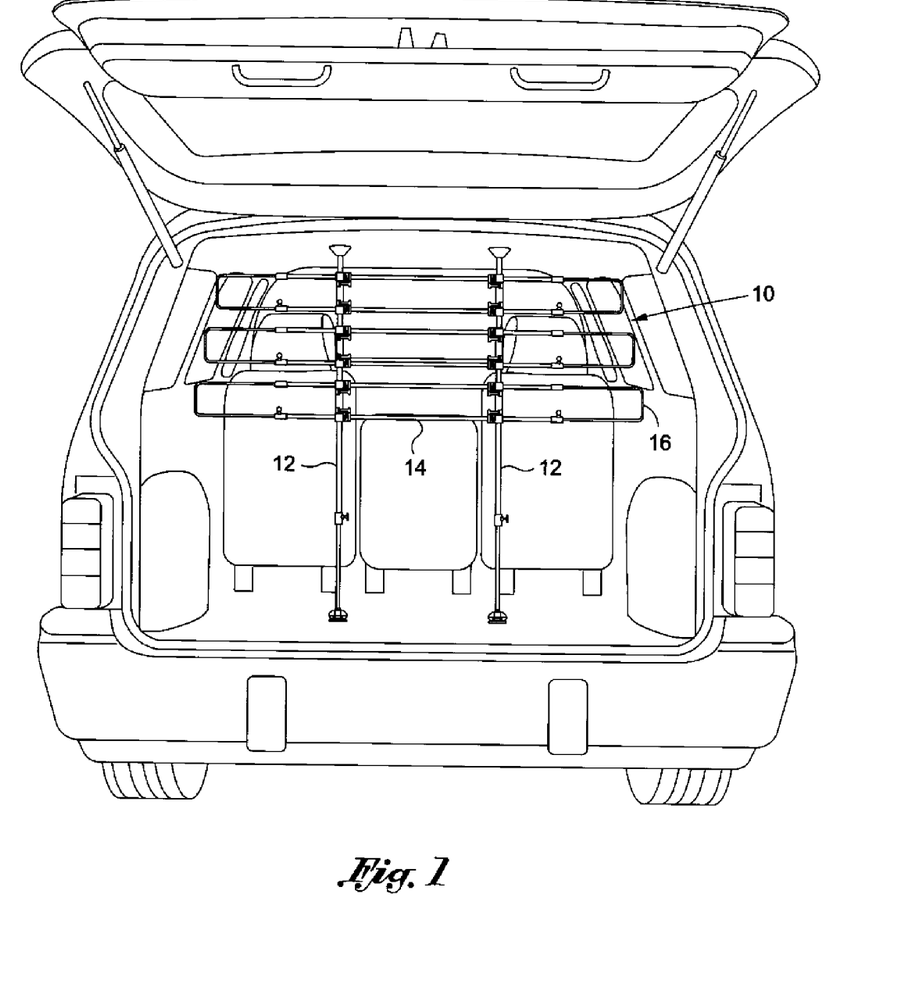
FIG. 1 is a front view of an animal fence installed in the truck of a vehicle, the animal fence having a plurality of horizontal members, a plurality of vertical members, and a plurality of connectors.
Figure 2:
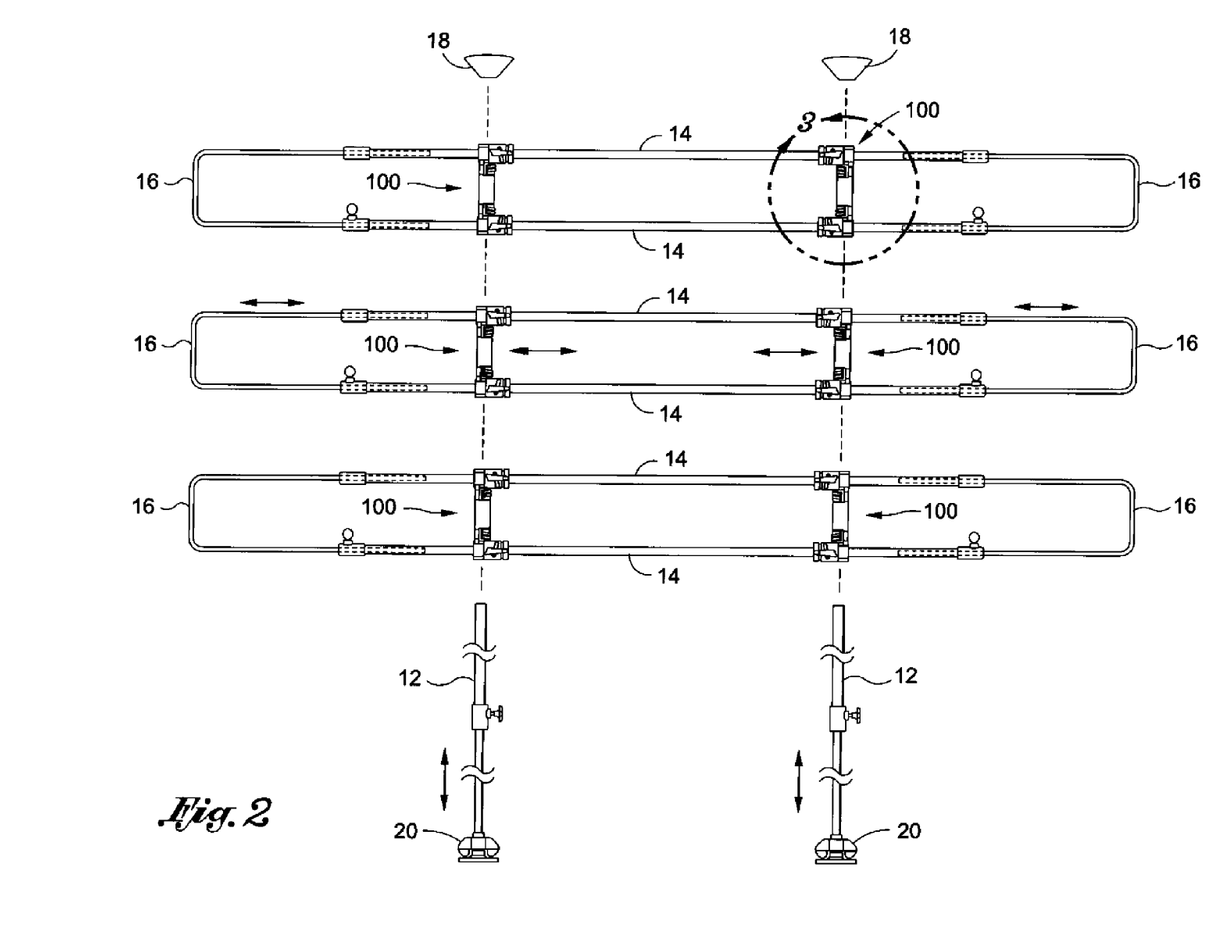
FIG. 2 is a front, partial exploded view of the animal fence depicted in FIG. 1.
Figure 3:
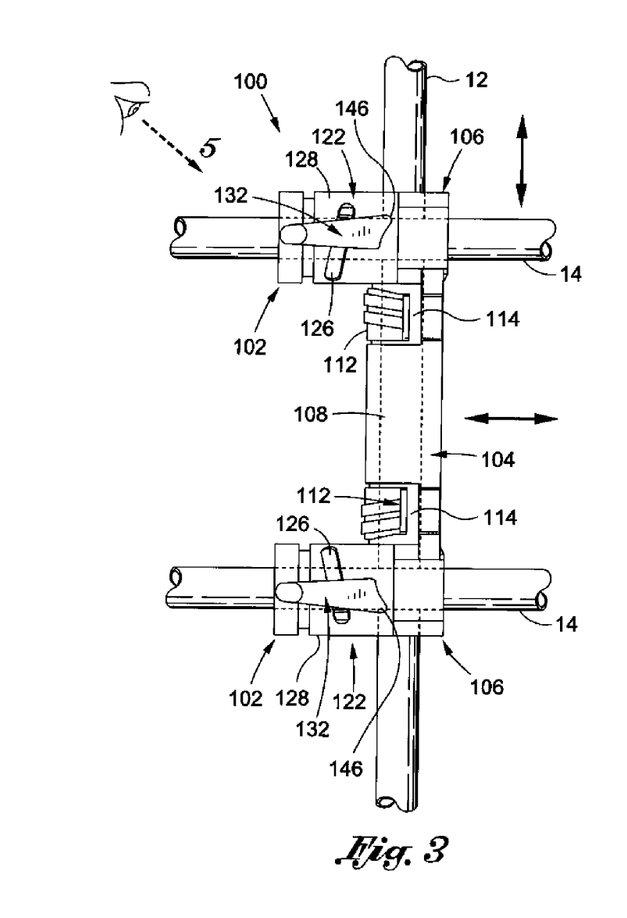
FIG. 3 is an enlarged, front view of the connector having a pair of locking members shown in respective release positions.

Referring now to the drawings, wherein the showings are for purposes of illustrating a preferred embodiment of the present invention only, and are not for purposes of limiting the same, there is depicted a connector 100 (see FIG. 2) for an animal fence or barrier 10. The fence 10 includes at least one vertical member (i.e., a first member) 12 extending along a vertical axis (i.e., a first axis), and a plurality of horizontal members (i.e., second members) 14, extending along respective horizontal axes (i.e., second axes). The vertical member 12 is connected to at least two horizontal members 14 via the connector 100 which allows for length adjustment (i.e., shortening or lengthening) of both the vertical member(s) 12 and the horizontal members 14. The connector 100 includes two locking members 102 (see FIG. 3), wherein each locking member 102 is configured to allow for simultaneous adjustment of the vertical member 12 and a respective one of the horizontal members 14. The locking members 102 are transitional, preferably rotatably transitional, between locked and unlocked positions, such that when the locking members 102 is in the unlocked position, the length of the vertical member 12 and corresponding horizontal member 14 may be adjusted. When the preferred length is achieved, the locking members 102 are transitioned to the locked position to lock the vertical and horizontal members 12, 14 in place to maintain the desired length.

The term "fence" will be used herein broadly to refer to a barrier, wall, blockade, obstacle or similar devices intended to restrict or confine an animal within a defined area. According to one embodiment, the fence is specifically configured and adapted to be placed within a vehicle, such as behind the seats or in the cargo area to define a space within the vehicle for an animal or pet. The lengthwise adjustment of both the vertical and horizontal members 12, 14 of the fence 10 allows the fence to be specifically fitted to the particular dimensions of the vehicle.

According to one embodiment, the connector 100 includes a primary sleeve 104 and a pair of secondary sleeves 106 coupled to the primary sleeve 104. The primary sleeve 104 includes a primary sleeve wall 108 defining a generally tubular configuration and including a primary inner opening 110 (see FIG. 6) disposed about a primary axis, wherein the primary inner opening 110 is sized to accommodate passage of the vertical member 12 therethough.

The primary sleeve 104 additionally includes a pair of primary clamping portions 112 integrally formed with the primary sleeve wall 108, wherein each primary clamping portion 112 is moveable relative the primary sleeve wall 108 to clamp/release a vertical member 12 disposed within the primary sleeve 104. According to one embodiment, the primary clamping portion 112 is separated from the primary sleeve wall 108 via a cutout 114 extending partially around the primary clamping portion 112 to allow the primary clamping portion 112 to move relative to the primary sleeve wall 108.

Figure 4:
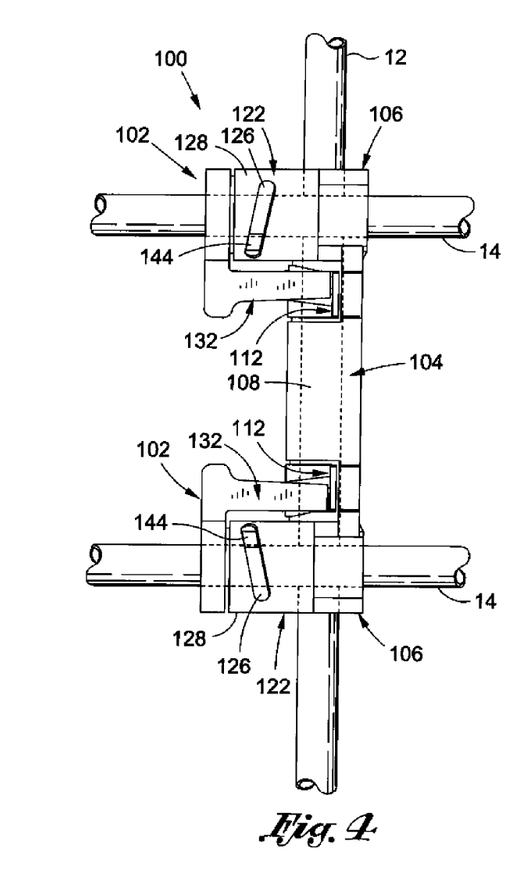
FIG. 4 is an enlarged, front view of the connector with the pair of locking members shown in respective clamping positions.
Figure 5:
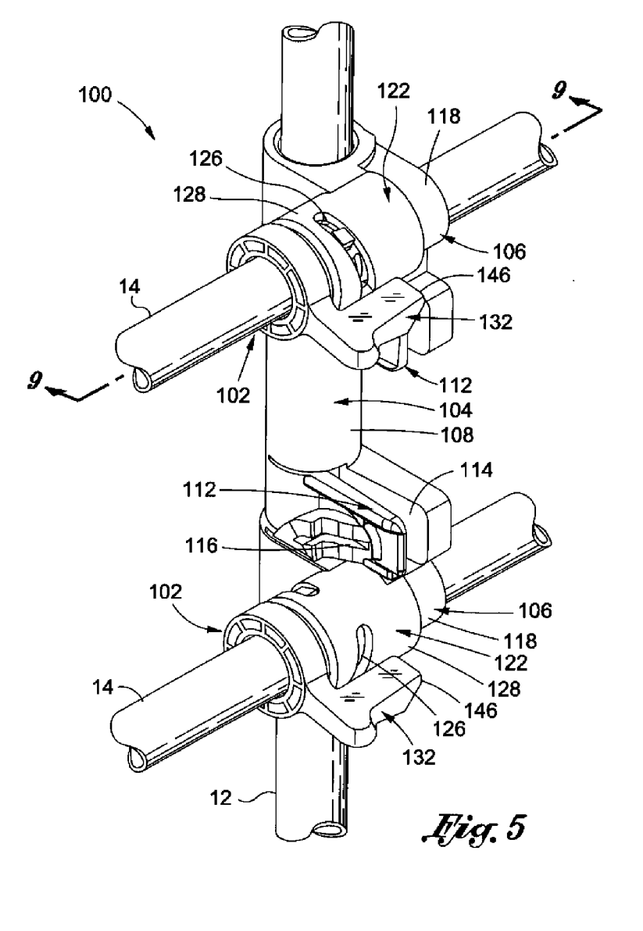
FIG. 5 is an enlarged, upper perspective view of the connector with one locking member transitioned toward the clamping position and the other locking member transitioned toward the release position.
Figure 9:
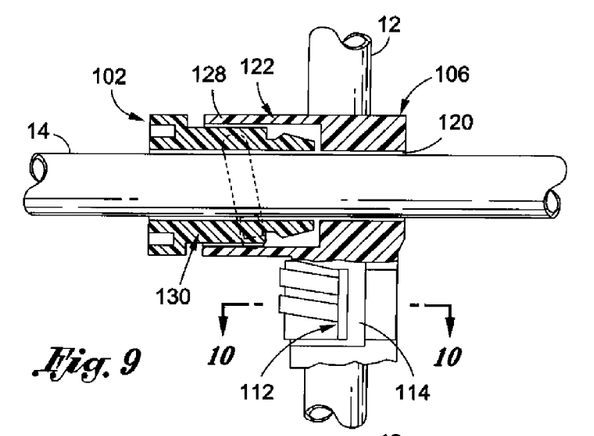
FIG. 9 is a front, partial sectional view depicting the locking member in a release position.
Figure 10:
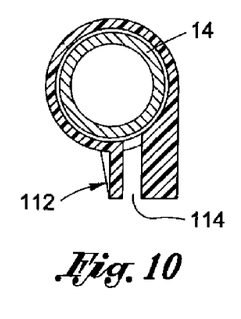
FIG. 10 is a sectional view depicting the connector in a release position.
Figure 11:
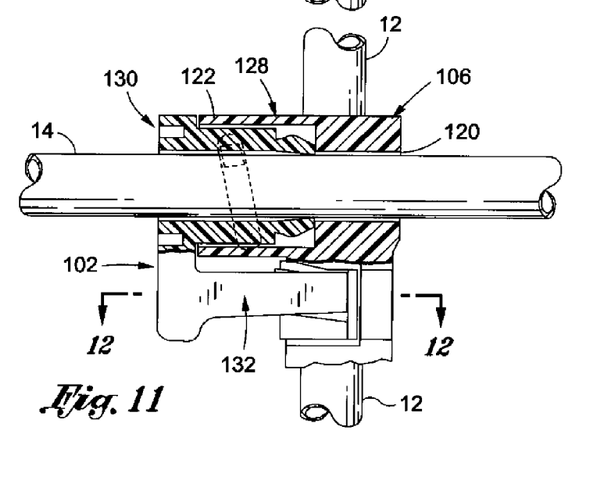
FIG. 11 is a front, partial sectional view depicting the locking member in a clamping position.
Figure 12:
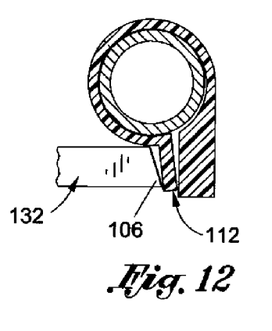
FIG. 12 is a sectional view depicting the connector in the clamping position.

Each primary clamping portion 112 is moveable relative to the primary sleeve wall 108 between a primary release position (see FIGS. 3 and 9-10) and a primary clamping position (see FIGS. 4 and 11-12), such that when the primary clamping portion 112 is moved toward the primary clamping position, the diameter of the primary inner opening 110 is decreased at the primary clamping portion 112, and when the primary clamping portion 112 is moved toward the primary release position, the diameter of the primary inner opening 110 is increased at the primary clamping portion 112. According to one embodiment, each primary clamping portion 112 is biased toward the primary release position and is only moved from the primary release position toward the primary clamping position with the application of force upon the primary clamping portion 112.

According to one implementation, each primary clamping portion 112 includes a primary cam segment 116 defining a contoured cam surface which is used to effectuate movement of the primary clamping portion 112 between the primary clamping position and the primary release position, as will be described in more detail below.

Each secondary sleeve 106 includes a secondary sleeve wall 118 which defines a generally tubular configuration and includes a secondary inner opening 120 disposed about a respective secondary axis, wherein each secondary inner opening 120 is sized to accommodate passage of a respective one of the horizontal members 14 therethrough. The pair of secondary sleeves 106 is coupled to the primary sleeve 104 in spaced relation to each other and adjacent respective end portions of the primary sleeve 104. Furthermore, the secondary axes are preferably substantially parallel to each other and substantially perpendicular to the primary axis.

According to one embodiment, the connector 100 includes a pair of cuffs 122 coupled to each secondary sleeve 106, and preferably integrally formed with the respective secondary sleeve 106. Each cuff 122 includes a cuff inner opening 124 in communication with a respective one of the secondary inner openings 120, wherein the cuff inner opening 124 defines a diameter that is larger than the diameter of the secondary inner opening 120. The larger diameter is configured to accommodate insertion of a locking member 102, as will be described in more detail below. The cuff inner opening 124 is further configured to accommodate passage of a respective horizontal member therethrough.

The cuff 122 preferably includes a guide slot 126 formed within a cuff wall 128, wherein the guide slot 126 has both axial and radial components relative to a longitudinal axis defined by the cuff 122. As will be described in more detail below, the guide slot 126 is used in connection with a locking member 102 to clamp or release the horizontal member extending through the secondary sleeve 106.

Figure 6:
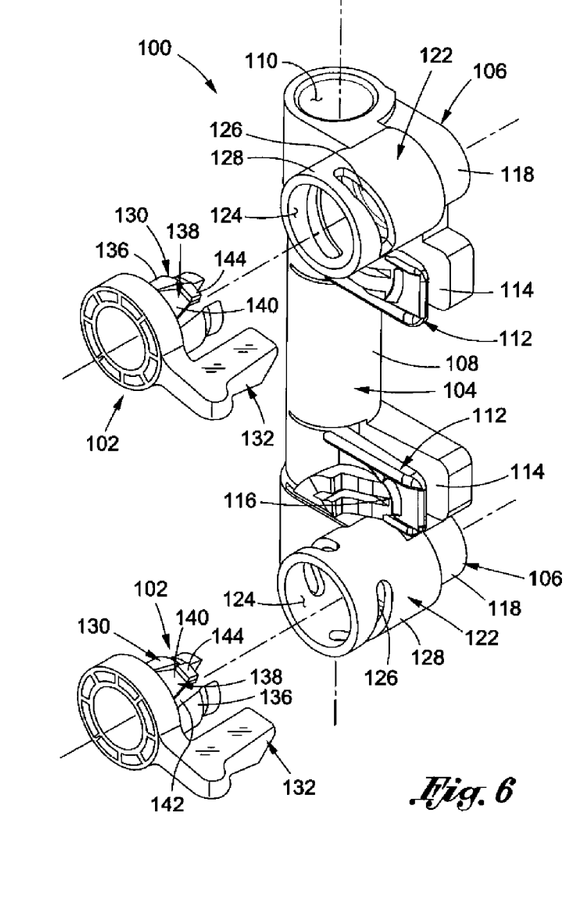
FIG. 6 is an enlarged, exploded, upper perspective view of the connector viewed from a first side.
Figure 7:
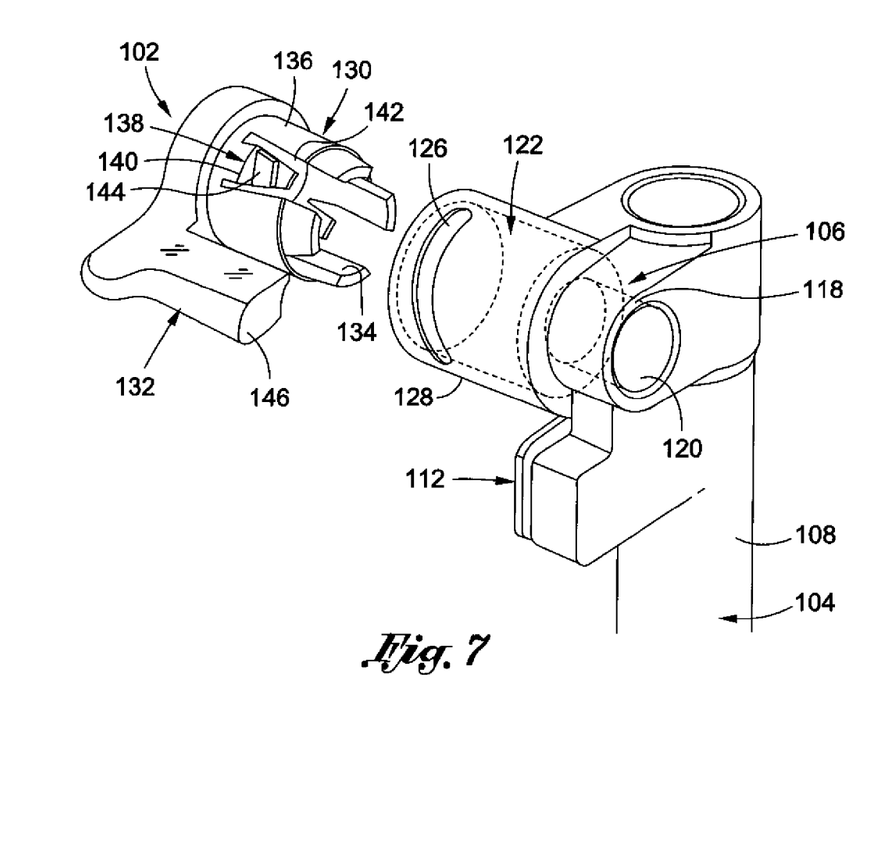
FIG. 7 is an enlarged, partial, exploded upper perspective view of the connector viewed from an opposing second side relative to FIG. 6.
Figure 8:
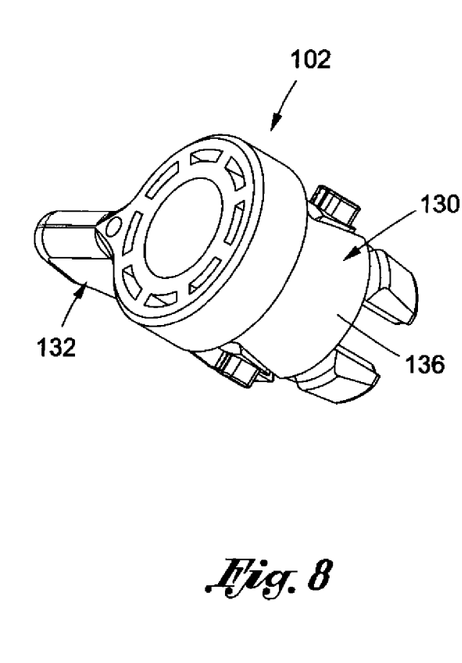
FIG. 8 is a perspective view of a locking member.

As noted above, the connector 100 additionally includes a pair of locking members 102 coupled to the primary sleeve 104 and respective ones of the secondary sleeves 106. FIGS. 6-7 show a locking member 102 exploded from the primary and secondary sleeves 104, 106 while FIG. 8 shows the locking member 102 by itself.

Each locking member 102 includes a tubular portion 130 and an arm 132 coupled to the tubular portion 130. The tubular portion 130 includes a tubular inner surface 134 and a tubular outer surface 136. The tubular inner surface 134 defines a tubular inner opening which is similar in size to the secondary inner opening 120. The locking member 102 is coupled to the secondary sleeve 106 such that the tubular inner opening is in communication with the secondary inner opening 120 to allow a horizontal member 14 to extend through both the secondary inner opening 120 and the tubular inner opening.

The locking member 102 additionally includes a secondary clamping portion 138 moveable relative to the tubular portion 130 between a secondary clamping position and a secondary release position for selectively clamping the horizontal member 14 extending through the secondary sleeve 106 and the locking member 102.

According to one embodiment, the secondary clamping portion 138 includes a clamping arm 140 formed integral to the tubular portion 130. A slot 142 may extend partially around the clamping arm 140 to separate a portion of the clamping arm 140 from the remainder of the tubular portion 130 to allow for movement of the clamping arm 140 between the secondary clamping and release positions relative to the tubular portion 130.

The clamping arm 140 includes a guide post 144 which extends in a radially outward direction (i.e., away from the tubular inner opening). The guide post 144 is configured to extend within the guide slot 126 formed within the cuff 122. The guide post 144 and guide slot 126 are configured to allow the guide post 144 to travel within the guide slot 126 in the secondary release position. When the guide post 144 reaches an end of the guide slot 126, the guide post 144 begins to engage with the cuff wall 128, which causes the guide post 144 to move from the secondary release position toward the secondary clamping position. As the guide post 144 moves from the secondary release position toward the secondary clamping position, the clamping arm 140 moves radially inward relative to the tubular portion 130 to apply a clamping force on the horizontal member extending through the locking member 102 and the secondary sleeve.

The locking member arm 132 is coupled to the tubular portion 130 and extends substantially parallel to an axis defined by the tubular portion 130. In this regard, the locking member arm 132 overlaps a portion of the tubular portion 130 and is separated from the tubular outer surface 136 by a gap, which is sized to accommodate the cuff 122 when the locking member 102 is engaged with the cuff 122. The locking member arm 132 includes an engagement end portion 146, which is configured to engage with the primary cam segment 116 of the primary clamping portion 112. As the engagement end portion 146 engages with the primary cam segment 116, the primary clamping portion 112 is transitioned from the primary release position toward the primary clamping position to reduce the diameter of the primary inner opening 110 at the primary clamping portion 112, which in turn applies a clamping force upon the vertical member extending therethrough.

The connector 100 is specifically configured and adapted to allow for simultaneous release and clamping of the horizontal member and a respective one of the vertical members extending through the connector 100. In particular, the locking member 102 is configured to rotate relative to the primary and secondary sleeves 104, 106 between a first, release position and a second, clamping position to effectuate the release and clamping described herein. In particular, when the locking member 102 is in the first position, the primary clamping portion 112 is in the primary release position and the secondary clamping portion 138 is in the secondary release position. When the locking member 102 moves to the second position, the engagement end portion 146 of the locking member arm 132 engages with the primary clamping portion 112 to move the primary clamping portion 112 toward the primary clamping position. Furthermore, the guide post 144 engages with the cuff wall 128 to move the clamping arm 140 toward the secondary clamping position.

As the locking member 102 moves from the second position toward the first position, the arm 132 becomes disengaged from the primary cam segment 116 to allow the primary clamping portion 112 to move back to the primary release position. Such movement also causes the guide post 144 to move back into the guide slot 142, which in turn, allows the clamping arm 140 to move back to the secondary release position.

Various embodiments of the connector 100 include structural configurations designed to prevent over-rotations of the locking member 102 relative to the cuff 122 or the primary clamping portion 112. For instance, the connector may include a raised element extending transversely across the primary cam segment 116 and configured to engage with the arm 132 as the locking element 102 is rotated toward the locked position. Another raised element may extend axially along the outer surface of the cuff 122 to engage with the arm 132 as the arm 132 rotates toward the locked position.

The connector 100 allows a user to quickly and easily adjust the horizontal and vertical dimensions of an animal fence to fit within their vehicle. Along these lines, a family may utilize a single animal fence for use in two different vehicles, such as a sedan and SUV. According to one embodiment, the animal fence may include several connectors 100 and include several horizontal members and several vertical members.

Each horizontal and vertical member may be configured to allow for lengthwise adjustment. For instance, each member may be telescopically adjustable between an extended position and a retracted position. It is contemplated that the horizontal and vertical members of the present invention may include suction devices 18, or may be formed without such suction devices. Likewise, the fence 10 may optionally include feet or lower supports 20 coupled to a distal end of the vertical members 12. For instance, the ends of the horizontal and vertical members may simply include a tip formed from a resilient material, such as rubber, plastic, foam or the like. Furthermore, it is also contemplated that various embodiments of the present invention may include U-shaped members 16 connecting pairs of horizontal members. The U-shaped members 16 may be adjustably coupled to the horizontal members 14 via a coupling member. The U-shaped members 16 may be adjusted relative to the horizontal members 14 via thumb screws, alien wrench, bolt, detents, a collet, or other mechanism adjustment devices known by those skilled in the art.

Those skilled in the art will readily appreciate that the terms "horizontal" and "vertical" are used herein for exemplary purposes only and are not intended to limit the scope of the present invention. Along these lines, the terms "horizontal" and "vertical" may refer to structural members extending along two intersecting axes. It is not required that the axes be perpendicular to each other, or aligned with a gravitational axis.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An adjustable animal barrier comprising:
   a first barrier member extending along a first axis; and
   a connector coupled to the first barrier member, the connector having:
      a connector body having a first opening configured to receive the first barrier member;
      a first clamp coupled to the connector body and configured to exert a first circumferential force upon the first barrier member, the first clamp being moveable relative to the connector body between a first clamping position and a first release position, the first circumferential force increasing as the first clamp moves from the first release position to the first clamp position;
      a locking member operatively coupled to the connector body and operatively coupled to the first clamp, the locking member being selectively transitional relative to the connector body between a locking member release position and a locking member clamping position, the locking member causing the first clamp to move toward the first clamp position as the locking member transitions from the locking member release position toward the locking member clamping position.

2. The adjustable animal barrier recited in claim 1, wherein the locking member and the first clamp is formed as a unitary structure.

3. The adjustable animal barrier recited in claim 1, wherein the locking member is rotatably coupled to the connector body.

4. The adjustable animal barrier recited in claim 1, wherein the first clamp is biased toward the first release position.

5. The adjustable animal barrier recited in claim 1, wherein the connector body includes a cuff and the locking member includes a shaft sized and configured to be disposed within the cuff.

6. The adjustable animal barrier recited in claim 5, wherein the cuff includes a slot and the locking member includes a guide moveable within the slot, such that movement of the guide within the slot causes the first clamp to transition between the first release position and the first clamp position.

7. The adjustable animal barrier recited in claim 1, wherein the first opening is spaced from the second opening.

8. The adjustable animal barrier recited in claim 1, further comprising:
   a second barrier member extending along a second axis perpendicular to the first axis;
   a second clamp coupled to the connector body and configured to exert a second circumferential force upon the second barrier member, the second clamp being moveable relative to the connector body between a second clamping position and a second release position, the second circumferential force increasing as the second clamp moves from the second release position to the second clamp position;

the locking member operatively coupled to the first and second clamps, the locking member causing the first and second clamps to move toward the first clamp position and second clamp position, respectively, as the locking member transitions from the locking member release position toward the locking member clamping position.

9. A connector for an adjustable animal barrier having a first barrier member, the connector comprising:

a connector body having a first opening configured to receive the first barrier member;

a first clamp coupled to the connector body and configured to exert a first circumferential force upon the first barrier member, the first clamp being moveable relative to the connector body between a first clamping position and a first release position, the first circumferential force increasing as the first clamp moves from the first release position the first clamp position;

a locking member operatively coupled to the connector body and operatively coupled to the first clamp, the locking member being selectively transitional relative to the connector body between a locking member release position and a locking member clamping position, the locking member causing the first clamp to move toward the first clamp position as the locking member transitions from the locking member release position toward the locking member clamping position.

10. The connector recited in claim 9, wherein the locking member and the first clamp is formed as a unitary structure.

11. The connector recited in claim 9, wherein the locking member is rotatably coupled to the connector body.

12. The connector recited in claim 9, wherein the first clamp is biased toward the first release position.

13. The connector recited in claim 9, wherein the connector body includes a cuff and the locking member includes a shaft sized and configured to be disposed within the cuff.

14. The connector recited in claim 13, wherein the cuff includes a slot and the locking member includes a guide moveable within the slot, such that movement of the guide within the slot causes the first clamp to transition between the first release position and the first clamp position.

15. The connector recited in claim 9, further comprising:

a second opening formed within the connector body, the first and second openings being disposed about respective axes that are perpendicular to each other;

a second clamp coupled to the connector body and configured to exert a second circumferential force upon the second barrier member, the second clamp being moveable relative to the connector body between a second clamping position and a second release position, the second circumferential force increasing as the second clamp moves from the second release position to the second clamp position;

the locking member operatively coupled to the first an second clamps, the locking member causing the first clamp and the second clamp to move toward the first clamp position and second clamp position, respectively, as the locking member transitions from the locking member release position toward the locking member clamping position.

* * * * *